United States Patent
Ouyang et al.

(10) Patent No.: US 10,420,127 B2
(45) Date of Patent: Sep. 17, 2019

(54) DATA TRANSMISSION METHOD, RELATED DEVICE, AND SYSTEM

(71) Applicant: HUAWEI TECHNOLOGIES CO., LTD., Shenzhen, Guangdong (CN)

(72) Inventors: Guowei Ouyang, Beijing (CN); Hui Jin, Beijing (CN); Qiang Yi, Beijing (CN); Yue He, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/737,934

(22) PCT Filed: Oct. 13, 2015

(86) PCT No.: PCT/CN2015/091885
§ 371 (c)(1),
(2) Date: Dec. 19, 2017

(87) PCT Pub. No.: WO2017/031816
PCT Pub. Date: Mar. 2, 2017

(65) Prior Publication Data
US 2018/0192433 A1    Jul. 5, 2018

(30) Foreign Application Priority Data
Aug. 25, 2015  (WO) ................ PCT/CN2015/088052

(51) Int. Cl.
*H04W 8/00* (2009.01)
*H04W 76/14* (2018.01)
(Continued)

(52) U.S. Cl.
CPC ....... *H04W 72/1242* (2013.01); *H04W 8/005* (2013.01); *H04W 72/10* (2013.01); *H04W 76/14* (2018.02); *H04W 88/04* (2013.01)

(58) Field of Classification Search
CPC .............................. H04W 72/10; H04W 88/04
(Continued)

(56) References Cited

U.S. PATENT DOCUMENTS

| | | | |
|---|---|---|---|
| 9,060,013 B2 | 6/2015 | Nakao et al. | |
| 2005/0097356 A1* | 5/2005 | Zilliacus | H04W 36/0066 726/4 |

(Continued)

FOREIGN PATENT DOCUMENTS

| | | |
|---|---|---|
| CN | 101499973 A | 8/2009 |
| CN | 101668314 A | 3/2010 |

(Continued)

OTHER PUBLICATIONS

XP050942774 S2-150893 Qualcomm Incorporated,"ProSe QoS",SA WG2 Meeting #108,San Jose Del Cabo, Mexico, Apr. 13-17, 2015(was S2-15xxxx),total 6 pages.
(Continued)

*Primary Examiner* — Angel T Brockman
(74) *Attorney, Agent, or Firm* — Fish & Richardson P.C.

(57) ABSTRACT

Methods and apparatus are provided to facilitate the minimally invasive removal of tissue and to facilitate the direct approach to anesthetizing a body wall of a patient. A pull-type cutting device also is disclosed to introduce an opening into the body wall to provide access for intra-chest surgical interventions, for example a minimally invasive biopsy technique as also described for excising target tissue from within a patient, including a nodule from within the patient's lung.

10 Claims, 12 Drawing Sheets

(51) Int. Cl.
*H04W 88/04* (2009.01)
*H04W 72/10* (2009.01)
*H04W 72/12* (2009.01)

(58) Field of Classification Search
USPC .......................................................... 370/235
See application file for complete search history.

(56) References Cited

U.S. PATENT DOCUMENTS

| | | | |
|---|---|---|---|
| 2009/0156213 A1* | 6/2009 | Spinelli | H04W 92/02 |
| | | | 455/436 |
| 2010/0027541 A1* | 2/2010 | Eriksson | H04W 72/005 |
| | | | 370/390 |
| 2012/0156985 A1 | 6/2012 | Li et al. | |
| 2013/0017802 A1 | 1/2013 | Adibi et al. | |
| 2015/0029866 A1 | 1/2015 | Liao et al. | |
| 2015/0230199 A1 | 8/2015 | Jeong et al. | |

FOREIGN PATENT DOCUMENTS

| | | |
|---|---|---|
| CN | 101742581 A | 6/2010 |
| CN | 101873632 A | 10/2010 |
| CN | 102546118 A | 7/2012 |
| CN | 103139100 A | 6/2013 |
| CN | 103812785 A | 5/2014 |
| CN | 103916330 A | 7/2014 |
| CN | 104320354 A | 1/2015 |
| CN | 104798421 A | 7/2015 |
| WO | 2016210048 A1 | 12/2016 |
| WO | 2017003550 A1 | 1/2017 |

OTHER PUBLICATIONS

XP050988362 S2-152681 Qualcomm Incorporated et al.,"ProSe Priority determination in ProSe UE-NW Relay",SA WG2 Meeting #110,Dubrovnik, Croatia, Jul. 6-10, 2015,total 6 pages.

3GPP TS 26.237 V10.3.0 (Sep. 2011),3rd Generation Partnership Project;Technical Specification Group Services and System Aspects;IP MultimediaSubsystem (IMS) based Packet Switch Streaming (PSS) and MultimediaBroadcast/Multicast Service (MBMS) User Service; Protocols(Release 10),total 138 pages.

XP050995819 3GPP TR 23.713 V1.5.0 (Jul. 2015),3rd Generation Partnership Project;Technical Specification Group Services and System Aspects;Study on extended architecture support for proximity-based services(Release 13),total 80 pages.

Extended European Search Report issued in European Application No. 15902087.4 on Jul. 31, 2018, 12 pages.

International Search Report in International Application No. PCT/CN2015/088052, dated May 25, 2016, 4 pages.

International Search Report in International Application No. PCT/CN2015/091885, dated May 20, 2016, 10 pages.

Communication pursuant to Article 94(3) EPC issued in European Application No. 15902087.4 dated Jun. 25, 2019, 13 pages.

* cited by examiner

| | 0 | | | | 1 | | | | 2 | | | | 3 | |
|---|---|---|---|---|---|---|---|---|---|---|---|---|---|---|
| 1 | 2 | 3 | ... | 7 | 8 | 9 | ... | 15 | 16 | 17 | ... | 23 | 24 | 25 | ... | 31 |
| Version | | | IHL | | DSCP | | | ECN | | Total Length | | | | |
| Identification | | | | | | | | | Flags | Fragment offset | | | | |
| Time to live | | | | | Protocol | | | | Header Checksum | | | | | |
| Source IP Address | | | | | | | | | | | | | | |
| Destination IP Address | | | | | | | | | | | | | | |
| Options (if IHL > 5) | | | | | | | | | | | | | | |

FIG. 2-1

|   | 0 | | | | 1 | | | | 2 | | | | 3 | |
|---|---|---|---|---|---|---|---|---|---|---|---|---|---|---|
| 1 | 2 | 3 | ... | 7 | 8 | ... | 11 | 15 | 16 | 17 | ... | 23 | 24 25 | ... 31 |
| Version | | | | Traffic Class | | | Payload Length | | | Flow Label | | | | |
| Time to live | | | | | | | Protocol | | | New Header | | | Hop Limit | |
| | | | | | | | | | | Header Checksum | | | | |
| Source Address | | | | | | | | | | | | | | |
| Destination IP Address | | | | | | | | | | | | | | |

FIG. 2-2

DATA TRANSMISSION METHOD, RELATED DEVICE, AND SYSTEM

CROSS-REFERENCE TO RELATED APPLICATIONS

This application is a national stage of International Application No. PCT/CN2015/091885, filed on Oct. 13, 2015, which claims priority to International Application No. PCT/CN2015/088052, filed on Aug. 25, 2015. Both of the aforementioned applications are hereby incorporated by reference in their entireties.

TECHNICAL FIELD

The present invention relates to the field of wireless communications technologies, and in particular, to a data transmission method, a related device, and a system.

BACKGROUND

In a conventional mobile network, a data communication path between user equipments (full name: User Equipment, UE for short) needs to pass through a core network entity, that is, a serving gateway (Serving Gateway, SGW) or a packet data network gateway (full name: Packet Data Network Gateway, P-GW for short). When the UEs are close to each other and need to transmit data, the data still needs to be transmitted over a core network. This occupies a large amount of bandwidth and imposes a high requirement on a bandwidth amount, and therefore transmission efficiency is relatively low. Currently, a proximity service (full name: Proximity Services, ProSe for short) technology is usually used. This technology mainly implements a direct data exchange between UEs close to each other without using a network, provided that the UEs can discover each other. A specific transmission process may be: Remote (Remote) UE outside cell coverage communicates with relay (Relay) UE within the cell coverage area by using the ProSe technology, and the relay UE forwards, by using an existing LTE technology, data sent by the remote UE to an evolved NodeB (Evolved Node Base, ENB for short) and to a P-GW, so as to implement a relay function.

When an application server (Application Server) sends data to remote UE, because priorities of data sent by an application layer are different, application servers have different priorities at the application layer (Application Layer), and relay UE can parse only an Internet Protocol header (full name: Internet Protocol, IP Header for short), the relay UE cannot learn an application layer priority after receiving the data. As a result, when sending the data to the remote UE, the relay UE can only process the data according to a priority sequence of the data.

To resolve the foregoing problem, the following manner is generally used in the prior art: When obtaining data from an application server, a P-GW maps the data to different data bearers according to an application level priority. Each bearer has a corresponding service quality class identifier (full name: Quality Class Identifier, QCI for short). Relay UE obtains a corresponding priority according to a QCI of a bearer on which received data is located and a preconfigured mapping relationship between a QCI and a priority (Priority), and processes the data according to a priority sequence.

However, the priority is a fixed parameter of the application level, and therefore the foregoing mapping relationship is fixed. In a unicast (Unicast) data transmission process, a defined quantity of QCIs is insufficient to form a one-to-one correspondence with an application level priority. When receiving multimedia broadcast multicast service (full name: Multimedia Broadcast Multicast Service, MBMS for short) data, relay UE does not know a QCI of the MBMS data. Therefore, the existing transmission rule is inapplicable to downlink transmission of MBMS data and unicast data.

SUMMARY

The present invention provides a data transmission method, a related device, and a system, so as to resolve a problem that an existing data priority obtaining manner cannot be applied to downlink transmission of MBMS data or unicast data.

A first aspect of embodiments of the present invention provides a data transmission method, where the method includes:

receiving, by a relay device, first downlink data sent by a gateway;

obtaining, by the relay device, a first service identifier of the first downlink data;

obtaining, by the relay device according to a first mapping relationship between a service identifier and per packet priority PPP information, first PPP information corresponding to the first service identifier; and forwarding, by the relay device, the first downlink data to a remote device according to the first PPP information.

With reference to the first aspect, in a first implementation of the first aspect of the present invention, the method further includes:

obtaining, by the relay device, the first mapping relationship from the proximity-based service entity. With the first mapping relationship set, the relay device can quickly and accurately obtain the first PPP information of the first downlink data, and therefore can transmit the first downlink data sequentially according to priority information. This ensures that data of a high priority is preferentially transmitted.

With reference to the first aspect or the first implementation of the first aspect, in a second implementation of the first aspect of the present invention, the first downlink data is first downlink unicast data, and the first service identifier includes one of the following:

a differentiated services code point DSCP, a traffic class TC, or a port number.

In this implementation, a corresponding PPP information obtaining mechanism is separately set for unicast data and multicast data. This completes downlink data transmission by using PPP information in cases of unicast, multicast, and different transmission protocol versions, and further improves the transmission mechanism. In addition, by setting a first mapping relationship between a port number and PPP information, the PPP information may also be obtained without a need to set a DSCP or a TC in a downlink data packet. This implements downlink transmission of unicast data, and reduces operation steps.

With reference to the first aspect or the first implementation of the first aspect, in a third implementation of the first aspect of the present invention, the first downlink data is first downlink multicast data, and the first service identifier is a temporary mobile group identity TMGI. By setting a first mapping relationship between a TMGI and PPP information, PPP information may also be obtained, without a need to set a DSCP or a TC in a downlink data packet. This implements downlink transmission of multicast data.

A second aspect of the present invention provides a data transmission method, where the method includes:

receiving, by a packet data network gateway, first downlink data sent by an application layer;

obtaining, by the packet data network gateway, first per packet priority PPP information from the first downlink data;

setting, by the packet data network gateway in the first downlink data according to a first mapping relationship between a service identifier and PPP information, a first service identifier corresponding to the first PPP information; and sending, by the packet data network gateway to the relay device, the first downlink data in which the first service identifier is set.

With reference to the second aspect, in a first implementation of the second aspect of the present invention, the first downlink data is first downlink unicast data, and the first service identifier includes:

a differentiated services code point DSCP or a traffic class TC.

In this implementation, a corresponding PPP information obtaining mechanism is set for unicast data of different transmission protocol versions. This completes downlink transmission of unicast data by using PPP information in cases of different transmission protocol versions, and further improves the transmission mechanism.

A third aspect of the present invention provides a data transmission method, where the method includes:

receiving, by an application server, a data priority request that carries a first temporary mobile group identity TMGI and that is sent by a proximity-based service entity; and obtaining, by the application server, first per packet priority PPP information corresponding to the first TMGI, and sending the first PPP information or a first mapping relationship between a TMGI and PPP information to a relay device by using the proximity-based service entity.

With reference to the third aspect, in a first implementation of the third aspect of the present invention, the method further includes:

sending, by the application server, a first notification message to the proximity-based service entity, where the first notification message carries a second mapping relationship between the first TMGI and second PPP information.

PPP information of some data is updated, so that a transmission mechanism is more flexible, and changes according to an actual service requirement. This ensures that data of a higher priority is preferentially transmitted.

A fourth aspect of the present invention provides a relay device, where the relay device includes:

a transmission module, configured to receive first downlink data sent by a gateway; and a processing module, configured to obtain a first service identifier of the first downlink data received by the transmission module;

obtain, according to a first mapping relationship between a service identifier and per packet priority PPP information, first PPP information corresponding to the first service identifier; and forward, by using the transmission module, the first downlink data to a remote device according to the first PPP information.

With reference to the fourth aspect, in a first implementation of the fourth aspect of the present invention, the transmission module is further configured to:

obtain the first mapping relationship from the proximity-based service entity.

With reference to the fourth aspect or the first implementation of the fourth aspect, in a second implementation of the fourth aspect of the present invention, the first downlink data is first downlink unicast data, and the first service identifier includes one of the following:

a differentiated services code point DSCP, a traffic class TC, or a port number.

With reference to the fourth aspect or the first implementation of the fourth aspect, in a third implementation of the fourth aspect of the present invention, the first downlink data is first downlink multicast data, and the first service identifier is a temporary mobile group identity TMGI.

The transmission module is specifically configured to receive first downlink multicast data sent by a multicast gateway.

The processing module is specifically configured to: obtain a first TMGI of the first downlink multicast data, and obtain, according to the first TMGI and a first mapping relationship between a TMGI and PPP information, fifth PPP information corresponding to the first TMGI; and forward the first downlink multicast data to the remote device according to the fifth PPP information by using the transmission module.

A fifth aspect of the present invention provides a packet data network gateway, where the packet data network gateway includes:

a transmission module, configured to receive first downlink data sent by an application layer; and a processing module, configured to: obtain first per packet priority PPP information from the first downlink data received by the transmission module;

set, in the first downlink data according to a first mapping relationship between a service identifier and PPP information, a first service identifier corresponding to the first PPP information; and send, to a relay device by using the transmission module, the first downlink data in which the first service identifier is set.

With reference to the fifth aspect, in a first implementation of the fifth aspect of the present invention, the first downlink data is first downlink unicast data, and the first service identifier includes a differentiated services code point DSCP or a traffic class TC.

A sixth aspect of the present invention provides an application server, where the application server includes:

a transmission module, configured to receive a data priority request that carries a first temporary mobile group identity TMGI and that is sent by a proximity-based service entity; and a processing module, configured to obtain first per packet priority PPP information corresponding to the first TMGI in the data priority request received by the transmission module, where the transmission module is further configured to send the first PPP information obtained by the processing module and a first mapping relationship between a TMGI and PPP information to a relay device by using the proximity-based service entity.

With reference to the sixth aspect, in a first implementation of the sixth aspect of the present invention, the transmission module is further configured to:

send a first notification message to the proximity-based service entity, where the first notification message carries a second mapping relationship between the TMGI and PPP information.

A seventh aspect of the present invention provides a data transmission method, where the method includes:

receiving, by a relay device, a first downlink data packet sent by a gateway;

obtaining, by the relay device according to an obtained first data stream description and a mapping relationship between a data stream description and proximity services per packet priority PPPP information, first PPPP information of the first downlink data packet; and forwarding, by the relay device, the first downlink data packet to the remote device according to the first PPPP information.

With reference to the seventh aspect, in a first implementation of the seventh aspect of the present invention, obtaining, by the relay device, the first data stream description according to the first downlink data packet includes:

filtering, by the relay device, the first downlink data packet, to determine the first data stream description corresponding to the first downlink data packet.

With reference to the seventh aspect, in a second implementation of the seventh aspect of the present invention, before the obtaining, by the relay device according to an obtained first data stream description and a mapping relationship between a data stream description and proximity services per packet priority PPPP information, first PPPP information of the first downlink data packet, the method further includes:

receiving, by the relay device, a first message sent by the remote device, where the first message carries the mapping relationship and the first data stream description, or the first message carries the mapping relationship.

With reference to the seventh aspect, or the first or the second implementation of the seventh aspect, in a third implementation of the seventh aspect of the present invention, when the first downlink data packet is a unicast data packet, the data stream description is an Internet Protocol IP 5-tuple; and the method further includes:

the data stream description is used to differentiate between PPPP information of unicast data packets from a same application server, the PPPP information of the unicast data packets is represented by a port number, and the IP 5-tuple includes a set of a same source address, a same destination address, and different port numbers. Downlink transmission of unicast data can be implemented by improving only the relay device. This reduces improvement costs, and is highly operable.

With reference to the seventh aspect, or the first or the second implementation of the seventh aspect, in a fourth implementation of the seventh aspect of the present invention, when the first downlink data packet is a multicast data packet, the first data stream description is a temporary mobile group identity TMGI.

With reference to the fourth implementation of the seventh aspect, in a fifth implementation of the seventh aspect of the present invention, the method further includes:

receiving, by the relay device, a priority update request sent by the remote device; and updating, by the relay device, the mapping relationship between the data stream description and PPPP information, and returning, by the relay device, a priority update response to the remote device, where the priority update response carries a mapping relationship between the TMGI and PPP information. Downlink transmission of unicast data can be implemented by improving only the relay device. This reduces improvement costs, and is highly operable.

With reference to any one of the seventh aspect or the first to the fifth implementations of the seventh aspect, in a sixth implementation of the seventh aspect of the present invention, the first data stream description is obtained in one of the following manners:

the first data stream description is generated by an application server according to an IP address of the remote device;

the first data stream description is obtained by the remote device by adding, to first identification information sent by the application server, the destination address of the IP 5-tuple and a destination port to which the first downlink data packet is sent, where the first identification information includes the source address of the IP 5-tuple and a source port that sends the first downlink data packet; or the first data stream description is generated by the relay device according to second identification information sent by the remote device, where the second identification information includes the source address of the IP 5-tuple, the destination address of the IP 5-tuple, a source port that sends the first downlink data packet, and a destination port to which the first downlink data packet is sent.

An eighth aspect of the present invention provides a data transmission method, where the method includes:

sending, by a remote device, a first message to a relay device, where the first message carries a first data stream description, or the first message carries a mapping relationship between a data stream description and proximity services per packet priority PPPP information; and receiving, by the remote device, a first downlink data packet sent by the relay device, where the first downlink data packet is a downlink data packet that is corresponding to first PPPP information and that is determined by the relay device according to at least one of the mapping relationship or the first data stream description after receiving the first downlink data packet sent by a gateway.

With reference to the eighth aspect, in a first implementation of the eighth aspect of the present invention, when the first downlink data packet is a unicast data packet, the first data stream description is an Internet Protocol IP 5-tuple. Downlink transmission of unicast data can be implemented by improving only the remote device. This reduces improvement costs, and is highly operable.

With reference to the eighth aspect, in a second implementation of the eighth aspect of the present invention, when the first downlink data packet is a multicast data packet, the first data stream description is a temporary mobile group identity TMGI. Downlink transmission of unicast data can be implemented by improving only the remote device. This reduces improvement costs, and is highly operable.

With reference to the eighth aspect, or the first or the second implementation of the eighth aspect of the present invention, in a third implementation of the eighth aspect of the present invention, the first data stream description is obtained in one of following manners:

the first data stream description is generated by an application server according to an IP address of the remote device; or the first data stream description is obtained by the remote device by adding, to first identification information sent by the application server, a destination address of the IP 5-tuple and a destination port to which the first downlink data packet is sent, where the first identification information includes a source address of the IP 5-tuple and a source port that sends the first downlink data packet.

With reference to any one of the eighth aspect or the first to the third implementations of the eighth aspect of the present invention, in a fourth implementation of the eighth aspect of the present invention, the method further includes:

sending, by the remote device, second identification information to the relay device, where the second identification information includes the source address of the IP 5-tuple, the destination address of the IP 5-tuple, the source port that sends the first downlink data packet, and the destination port to which the first downlink data packet is sent.

A ninth aspect of the present invention provides a relay device, where the relay device includes:

a processor;

a memory, configured to store executable program code;

a communications interface; and a receiver and a transmitter, where the processor, the receiver, the transmitter, the storage device, and the communications interface communicate with each other by using a bus;

the processor reads program code and data stored in the storage device, where the program code includes an instruction, and when the processor executes the instruction, the instruction instructs the processor to perform the following operations:

receiving, by using the receiver, a first downlink data packet sent by a gateway;

obtaining a first data stream description according to the first downlink data packet;

obtaining, according to the first data stream description and a mapping relationship between a data stream description and proximity services per packet priority PPPP information, first PPPP information of the first downlink data packet; and forwarding, by using the transmitter, the first downlink data packet to the remote device according to the first PPPP information.

With reference to the ninth aspect, in a first implementation of the ninth aspect of the present invention, the processor specifically performs the following step:

filtering the first downlink data packet, to determine the first data stream description corresponding to the first downlink data packet.

With reference to the ninth aspect, in a second implementation of the ninth aspect of the present invention, the processor may further perform the following step:

receiving, by using the receiver, a first message sent by the remote device, where the first message carries the mapping relationship.

With reference to the ninth aspect, or the first or the second implementation of the ninth aspect, in a third implementation of the ninth aspect of the present invention, the first downlink data packet is a unicast data packet, and the data stream description is an Internet Protocol IP 5-tuple; and the data stream description is used to differentiate between PPPP information of unicast data packets from a same application server, the PPPP information of the unicast data packets is represented by a port number, and the IP 5-tuple includes a set of a same source address, a same destination address, and different port numbers.

With reference to the ninth aspect, or the first or the second implementation of the ninth aspect, in a fourth implementation of the ninth aspect of the present invention, the first downlink data packet is a multicast data packet, and the data stream description is a temporary mobile group identity TMGI.

With reference to the fourth implementation of the ninth aspect, in a fifth implementation of the ninth aspect of the present invention, the processor may further perform the following step:

receiving, by using the transmitter, a priority update request sent by the remote device;

updating the mapping relationship between the data stream description and PPPP information; and returning a priority update response to the remote device by using the transmitter.

With reference to any one of the ninth aspect or the first to the fifth implementations of the ninth aspect, in a sixth implementation of the ninth aspect of the present invention, the first data stream description is obtained in one of the following manners:

the first data stream description is generated by an application server according to an IP address of the remote device;

the first data stream description is obtained by the remote device by adding, to first identification information sent by the application server, the destination address of the IP 5-tuple and a destination port to which the first downlink data packet is sent, where the first identification information includes the source address of the IP 5-tuple and a source port that sends the first downlink data packet; or the first data stream description is generated by the relay device according to second identification information sent by the remote device, where the second identification information includes the source address of the IP 5-tuple, the destination address of the IP 5-tuple, a source port that sends the first downlink data packet, and a destination port to which the first downlink data packet is sent.

A tenth aspect of the present invention provides a remote device, where the remote device includes:

a processor;

a memory, configured to store executable program code;

a communications interface; and a receiver and a transmitter, where the processor, the receiver, the transmitter, the storage device, and the communications interface communicate with each other by using a bus;

the processor reads program code and data stored in the storage device, where the program code includes an instruction, and when the processor executes the instruction, the instruction instructs the processor to perform the following operations:

sending a first message to a relay device by using the transmitter, where the first message carries a first data stream description, or the first message carries a mapping relationship between a data stream description and proximity services per packet priority PPPP information; and receiving, by using the receiver, a first downlink data packet sent by the relay device, where the first downlink data packet is a downlink data packet that is corresponding to first PPPP information and that is determined by the relay device according to at least one of the mapping relationship or the first data stream description after receiving the first downlink data packet sent by a gateway.

With reference to the tenth aspect, in a first implementation of the tenth aspect of the present invention, when the first downlink data packet is a unicast data packet, the first data stream description is an Internet Protocol IP 5-tuple.

With reference to the tenth aspect, in a second implementation of the tenth aspect of the present invention, when the first downlink data packet is a multicast data packet, the first data stream description is a temporary mobile group identity TMGI.

With reference to the tenth aspect, or the first or the second implementation of the tenth aspect of the present invention, in a third implementation of the eighth aspect of the present invention, the first data stream description is obtained in one of following manners:

the first data stream description is generated by an application server according to an IP address of the remote device; or the first data stream description is obtained by the remote device by adding, to first identification information sent by the application server, a destination address of the IP 5-tuple and a destination port to which the first downlink data packet is sent, where the first identification information includes a source address of the IP 5-tuple and a source port that sends the first downlink data packet.

With reference to any one of the tenth aspect or the first to the third implementations of the tenth aspect of the present invention, in a fourth implementation of the tenth aspect of the present invention, the processor may further perform the following step:

sending, by using the transmitter, second identification information to the relay device, where the second identification information includes the source address of the IP 5-tuple, the destination address of the IP 5-tuple, the source port that sends the first downlink data packet, and the destination port to which the first downlink data packet is sent.

In the embodiments of the present invention, the relay device pre-configures the first mapping relationship between a service identifier and PPP information, and after receiving the first downlink data, the relay device obtains the first service identifier of the first downlink data, and obtains, according to the first mapping relationship, the first PPP information corresponding to the first service identifier, and then forwards the first downlink data according to the first PPP information. PPP information of a downlink data packet can be accurately and quickly obtained, and a rate and accuracy of downlink data transmission are improved.

BRIEF DESCRIPTION OF DRAWINGS

FIG. 2-1 is a schematic structural diagram of first downlink data according to an embodiment of the present invention;

FIG. 2-2 is another schematic structural diagram of first downlink data according to an embodiment of the present invention;

DESCRIPTION OF EMBODIMENTS

Figure 1:
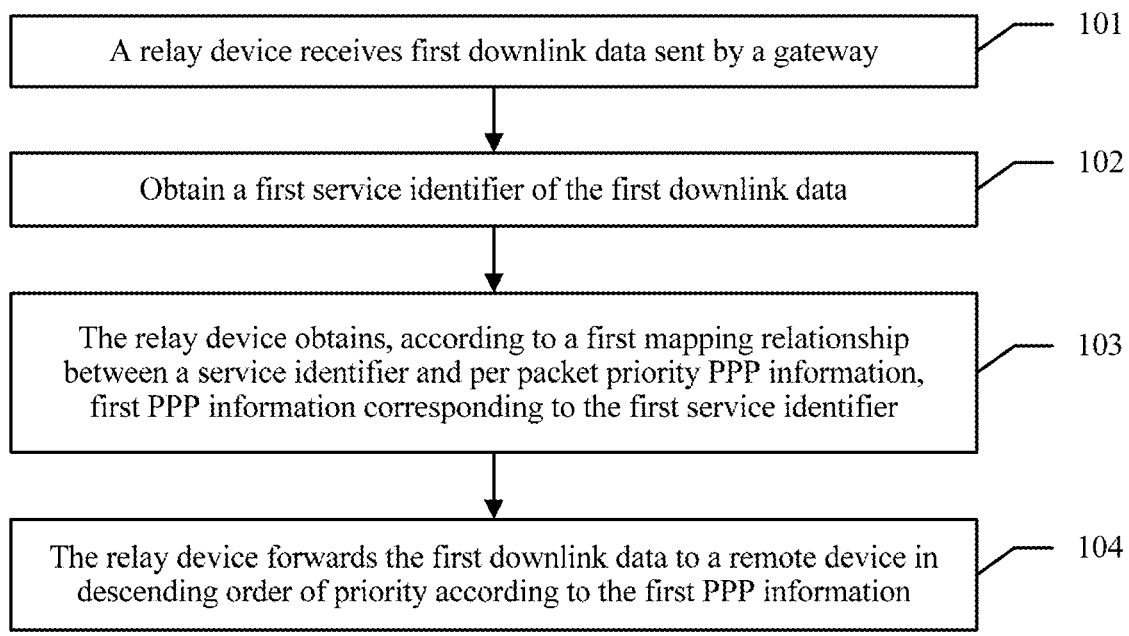
FIG. 1 is a flowchart of a data transmission method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. The module division in this specification is merely logical function division and may be other division in actual implementation. For example, multiple modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or other forms, which is not limited in this specification. In addition, the modules or submodules described as separate parts may or may not be physically separate, may or may not be physical modules, or may be distributed on multiple circuit modules. Some or all of the modules may be selected according to actual needs to achieve the objectives of the solutions of the embodiments in the present invention.

The embodiments of the present invention provide a data transmission method, a related device, and a system, which are used in the field of wireless communications technologies and can resolve a problem that an existing data priority obtaining manner cannot be applied to downlink transmission of eMBMS data and unicast data. Details are described below.

In the current technical field, a protocol stipulates that unicast data can be processed only by using a packet data network gateway, and MBMS data can be processed only by using an MBMS gateway. For example, in a process in which a relay device receives MBMS data from an MBMS gateway, according to an existing transmission mechanism, that is, when PPP information is determined according to a QCI, a QCI of the MBMS data cannot be learned. Therefore, corresponding PPP information cannot be obtained, and consequently, the relay device cannot transmit the data according to the PPP information.

In addition, a remote device in the specification is a device that cannot directly communicate with a network side, and the remote device needs to be connected to a network by using a relay device. The relay device is a connection device for data transmission between the remote device and the network side.

To resolve the foregoing technical problem, the embodiments of the present invention provide the following main solutions:

1. Obtain a first service identifier of downlink data.

The first service identifier may include differentiated services code point (full name: Differentiated Services Code Point, DSCP) information, a temporary mobile group identity (full name: Temporary Mobile Group Identity, TMGI), or a traffic class (full name: Traffic Class, TC), or may directly use a port number.

A DSCP uses six used bits and two unused bits in a type of service TOS identifier byte of each data header to differentiate a priority by using a code value.

The TC represents a type or a priority sequence of an encapsulated IPv6 packet.

The port number may be a source port number, a destination port number, or a combination of a source port number and a destination port number.

The TMGI is dynamically allocated by using broadcast/multicast service control (full name: Broadcast Multicast-Service Control, BM-SC for short). The TMGI may be used for identification of a multicast service message or a broadcast service message.

2. Pre-configure a first mapping relationship between a service identifier and per packet priority (full name: Per packet priority, PPP for short) information.

The PPP information represents a priority of each piece of data during transmission, that is, priorities of different data packets within UE or between UEs during transmission of data on a PC5 interface. In addition, the data in the specification may also be referred to as a data packet, and a priority of data may be referred to as a priority of data packet, and there is no differentiation.

3. Obtain first PPP information according to the first mapping relationship and the first service identifier, and forward downlink (full name: downlink, DL for short) data by using the first PPP information.

Referring to FIG. 1, the following describes a data transmission method in the present invention by using an example from a perspective of a relay device. The method includes the following steps.

101. The relay device receives first downlink data sent by a gateway.

102. The relay device obtains a first service identifier of the first downlink data.

The first service identifier may be directly obtained. If the first service identifier is set in an IP header, that is, a data header of the first downlink data, the relay device may directly read the first service identifier.

It may be understood that the gateway may include a P-GW, an SGW, a multicast gateway (Multimedia Broadcast Multicast Service, MBMS-GW for short), or the like.

103. The relay device obtains, according to a first mapping relationship between a service identifier and per packet priority PPP information, first PPP information corresponding to the first service identifier.

The first mapping relationship may be obtained from information received by an application server, or may be obtained from a proximity-based service entity in an authentication process.

104. The relay device forwards the first downlink data to a remote device according to the first PPP information.

That is, when multiple data packets need to be forwarded, the data packets need to be forwarded according to PPP information of each data packet and according to descending order of priority. For example, a data packet of a priority 1 has a highest priority. Therefore, before processing a data packet of a priority N+1, the relay device first processes all data packets of a priority N.

In this embodiment of the present invention, the relay device pre-configures the first mapping relationship between a service identifier and PPP information. After receiving the first downlink data, the relay device obtains the first service identifier of the first downlink data, and obtains, according to the first mapping relationship, the first PPP information corresponding to the first service identifier, and then forwards the first downlink data according to the first PPP information. This ensures that the relay device quickly forwards data of a high priority according to a data priority, and accurately and quickly obtains PPP information of a downlink data packet, without a need to perform mapping for multiple times. This effectively improves a rate and accuracy of downlink data transmission.

The first mapping relationship may be obtained from the proximity-based service entity, or may be pre-configured, or may be obtained from the foregoing gateway or another network element. A specific obtaining manner is not limited in the specification. With the first mapping relationship set, the relay device can quickly and accurately obtain the first PPP information of the first downlink data, and therefore can accurately transmit the first downlink data. This improves data accuracy, and reduces a transmission delay.

Optionally, because the first downlink data packet includes unicast data or multicast data, and mechanisms for transmitting the unicast data and the multicast data are different, corresponding settings need to be performed for the unicast data and the multicast data separately. That is, when the first downlink data is first downlink unicast data, the first service identifier includes one of the following:

a differentiated services code point DSCP, a traffic class TC, or port number.

Alternatively, when the first downlink data is first downlink multicast data, the first service identifier is a temporary mobile group identity TMGI.

Therefore, the first mapping relationship includes:

a first mapping relationship between a DSCP and PPP information, a first mapping relationship between a TMGI and PPP information, a first mapping relationship between a TC and PPP information, or a first mapping relationship between a port number and PPP information.

In this implementation, a corresponding PPP information obtaining mechanism is separately set for unicast data and multicast data. This completes downlink data transmission by using PPP information in cases of unicast, multicast, and different transmission protocol versions, and further improves the transmission mechanism.

For example, because downlink transmission is performed on unicast data and MBMS data, used mapping relationships are different. The following describes separately downlink transmission of the unicast data and the MBMS data.

1. For the unicast data, the first mapping relationship between a DSCP and PPP information, the first mapping relationship between a TC and PPP information, or the first mapping relationship between a port number and PPP information may be used to obtain corresponding PPP information, to subsequently transmit the first downlink data. Details are as follows.

a. When the first service identifier is a DSCP, after receiving the first downlink unicast data, the relay device obtains a first DSCP from the first downlink unicast data, and obtains, according to the first mapping relationship between a DSCP and PPP information, second PPP information corresponding to the first DSCP, and forwards the first downlink unicast data to the remote device according to the second PPP information.

It can be learned that for Internet Protocol version 4 (full name: Internet Protocol Version4, IPV4 for short), a DSCP may be used, that is, only for IPv4 unicast data.

b. When the first service identifier is a TC, after receiving first downlink unicast data, the relay device obtains a first TC from the first downlink unicast data, and obtains, according to the first mapping relationship between a TC and PPP information, third PPP information corresponding to the first TC, and forwards the first downlink unicast data to the remote device according to the third PPP information.

It can be learned that for Internet Protocol version 6 (full name: Internet Protocol Version6, IPV6 for short), a TC may be used, that is, only for IPv6 unicast data.

c. When the first service identifier is a port number, after receiving the first downlink unicast data, the relay device obtains a first port number from the first downlink unicast data, and obtains, according to the first mapping relationship between a port number and PPP information, fourth PPP information corresponding to the first port number, and forwards the first downlink unicast data to the remote device according to the fourth PPP information.

In the two cases a and b, a DSCP or TC flag needs to be set in a data header of the downlink data, but in the case c, the first mapping relationship between a port number and PPP information may be directly configured, without a need to additionally set a flag in the downlink data. This effectively simplifies an operation and reduces a transmission delay. In addition, PPP information may also be obtained according to the first mapping relationship between a port number and PPP information when a DSCP or a TC is not set in a downlink data packet, thereby implementing downlink transmission of unicast data.

2. For the MBMS data, the first mapping relationship between a TMGI and PPP information may be used to obtain corresponding PPP information. That is, when the first service identifier is a TMGI, after receiving first downlink multicast data sent by a multicast gateway, the relay device obtains a first TMGI of the first downlink multicast data, obtains, according to the first TMGI and the first mapping relationship between a TMGI and PPP information, fifth PPP information corresponding to the first TMGI, and forwards the first downlink multicast data to the remote device according to the fifth PPP information. It can be learned that, by setting the first mapping relationship between a TMGI and PPP information, PPP information may also be obtained, without a need to set a DSCP or a TC in a downlink data packet, thereby implementing downlink transmission of multicast data.

Optionally, the foregoing mapping relationships may further include a QCI of data. The relay device preferentially processes data with a high-priority QCI, that is, processes, according to descending order of a class identified by a QCI, data corresponding to a QCI. That is, a QCI class sequence of data is first determined. If multiple data packets are corresponding to a same QCI (that is, multiple pieces of PPP information are corresponding to a same QCI), PPP information corresponding to a DSCP of each piece of data may be obtained according to the second mapping relationship, and then a transmission operation can be performed according to the obtained PPP information. This can implement class-based processing, so that transmission is performed orderly and effectively.

For example, there are multiple types of pathways to drive from a city A to a city B (a QCI is used to present a pathway class, for example, there are an express pathway, a fast pathway, a slow pathway, and the like). Trains corresponding to the three types of pathways are first determined according to a QCI, and trains that belong to a same type of pathway (each train is identified with a corresponding DSCP) separately and successively start off according to a specified start-off time (PPP information). In this way, normal operation of a station can be managed in order.

Optionally, in a first optional embodiment of the embodiments of the present invention, if the relay device does not store the first PPP information corresponding to the first TMGI, the relay device sends a TMGI priority request message to a multicast session layer. Therefore, before the relay device obtains, according to the first mapping relationship between a service identifier and per packet priority PPP information, the first PPP information corresponding to the first service identifier, the method further includes:

receiving, by the relay device, a monitoring request that carries the first TMGI and that is sent by the remote device;

sending, by the relay device to the proximity-based service entity, a data priority request that carries the first TMGI; and receiving, by the relay device, a data priority response that is sent by the proximity-based service entity and that carries a first mapping relationship between a TMGI and PPP information or carries the first PPP information.

Optionally, on the basis of the foregoing first optional embodiment, in a second optional embodiment of the embodiments of the present invention, before the relay device receives the first downlink multicast data sent by a multicast gateway, the method further includes:

receiving, by the relay device, a first notification message sent by the proximity-based service entity, where the first notification message carries a second mapping relationship between the first service identifier and the PPP information, and the second mapping relationship is obtained by the proximity-based service entity from the application server; and updating, by the relay device, the first mapping relationship to the second mapping relationship.

The first notification message is a message sent by the proximity-based service entity to the relay device after the application server sends, when determining that PPP information of at least one piece of downlink multicast data in multiple pieces of downlink multicast data changes (for example, becomes higher or lower), a second notification message to the proximity-based service entity, or the first notification message may be a TMGI priority change notification message delivered by the multicast session layer when voluntarily determining to change PPP information of some TMGIs. PPP information of some data is updated, so that a transmission mechanism is more flexible, and changes according to an actual service requirement. This ensures that data of a higher priority is preferentially transmitted (for example, in a specific time period, a priority of data A is relatively low, and the priority of the data A may become higher in a specific time period, and therefore the transmission mechanism needs to be updated to obtain a right for preferential transmission).

For example, after the relay device updates the locally configured first mapping relationship between a TMGI and PPP information to the second mapping relationship, a processing rule for a downlink data packet is as follows:

Before the first mapping relationship between a TMGI and PPP information is updated, a received downlink data packet is processed according to an original priority. After the first mapping relationship between a TMGI and PPP information is updated, a received downlink data packet is processed according to a new priority. Details are not described in the specification.

It may be understood that when the PPP information of the at least one piece of downlink multicast data changes, it can be set that the first notification message is sent when a trigger condition is met. For example, the trigger condition may be meeting at least one of a or b:

a. PPP information of m downlink multicast data packets changes. b. Change values of PPP information of n downlink multicast data packets exceed a first threshold.

Certainly, a period t may also be set to report the first notification message, so as to avoid frequent updates.

Figure 2:
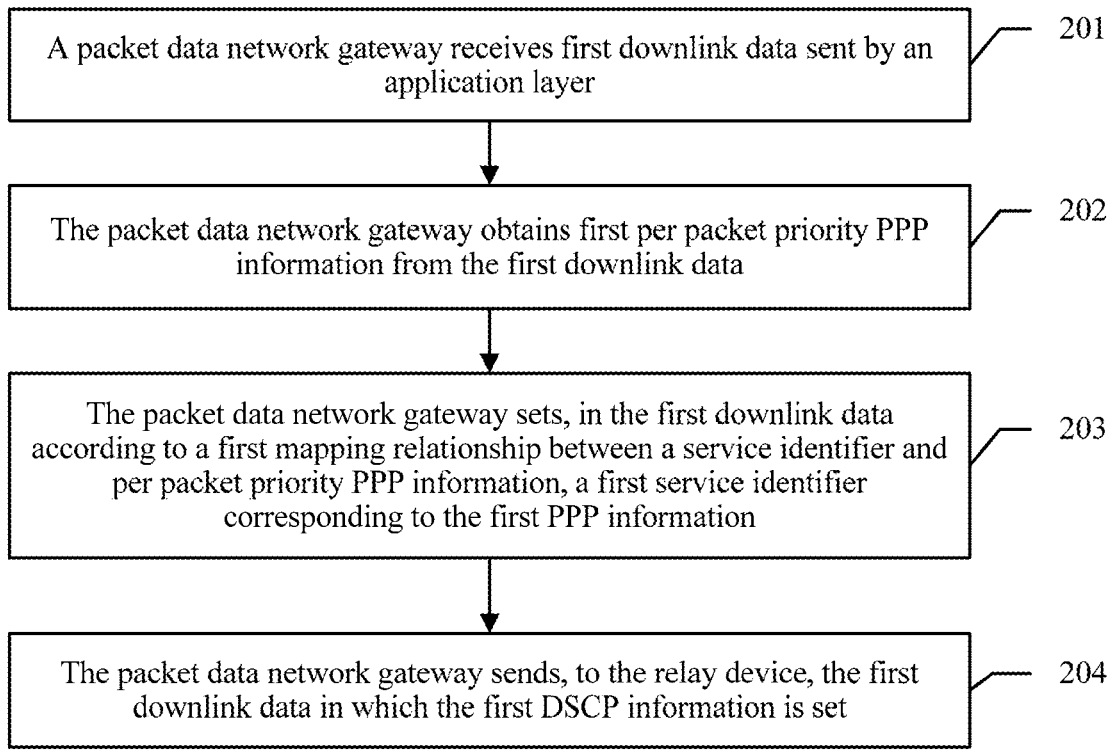
FIG. 2 is a flowchart of a data transmission method according to an embodiment of the present invention.

Referring to FIG. 2, the following describes a data transmission method in the present invention by using an example from a perspective of a packet data network gateway. The method includes the following steps.

201. The packet data network gateway receives first downlink data sent by an application layer.

The first downlink data is unicast data.

202. The packet data network gateway obtains first per packet priority PPP information from the first downlink data.

The packet data network gateway may pre-configure an appropriate policy and charging control (full name: Policy and charging control, PCC for short) rule. For example, the packet data network gateway may determine the PPP information of the first downlink data packet by using an application identifier in the PCC rule. In addition, the packet data network gateway may also configure a first mapping relationship between an application identifier and PPP information for the application layer.

After the application layer receives the first downlink data, the packet data network gateway may obtain, according to the PCC rule, the first PPP information from the first downlink data by means of filtering.

203. The packet data network gateway sets, in the first downlink data according to a first mapping relationship between a service identifier and per packet priority PPP information, a first service identifier corresponding to the first PPP information.

The first service identifier includes a differentiated services code point DSCP or a traffic class TC, and the first mapping relationship includes:

a first mapping relationship between a DSCP and PPP information, and a first mapping relationship between a TC and PPP information.

Specifically, the packet data network gateway may set the first application identifier in a data header of the first downlink data according to the locally stored first mapping relationship. That is, the packet data network gateway may set the first DSCP or the first TC in the data header of the first downlink data. Specifically, for a data structure diagram in which the first DSCP is set, refer to FIG. 2-1, and for a data structure diagram in which the first TC is set, refer to FIG. 2-2.

204. The packet data network gateway sends, to a relay device, the first downlink data in which the first service identifier is set.

Specifically, the packet data network gateway maps the first downlink data packet to a corresponding data bearer by using a downlink traffic filter template (full name: Traffic Filter Template, TFT for short). The TFT is a set of all filters for data packets mapped to data bearers.

The first service identifier is set in the first downlink data, so that after obtaining the first service identifier, the relay device obtains, according to the first mapping relationship, the first PPP information corresponding to the first service identifier, and forwards the first downlink data to the remote device according to the first PPP information.

In this embodiment of the present invention, the packet data network gateway sets the first service identifier in the received first downlink data according to the locally stored first mapping relationship, so that after receiving the first downlink data, the relay device obtains the first service identifier from the first downlink data, and obtains, according to the first mapping relationship, the first PPP information corresponding to the first service identifier, and then forwards the first downlink data according to the first PPP information. This ensures that the relay device quickly forwards data of a high priority according to a data priority.

For example, for unicast data, the first mapping relationship between a DSCP and PPP information or the first mapping relationship between a TC and PPP information may be used to obtain corresponding PPP information, to subsequently transmit the first downlink data. Details are as follows.

1. When the first service identifier is a DSCP (for IPv4), the packet data network gateway obtains the first PPP information from the first downlink data;

the packet data network gateway sets, in the first downlink data according to the first mapping relationship between a DSCP and PPP information, a first DSCP corresponding to the first PPP information; and the packet data network gateway sends, to the relay device, the first downlink data in which the first DSCP is set, so that after obtaining the first DSCP, the relay device obtains, according to the first mapping relationship, the first PPP information corresponding to the first DSCP, and forwards the first downlink data to the remote device according to the first PPP information.

2. When the first service identifier is a TC (for IPv6), the packet data network gateway obtains the first PPP information from the first downlink data;

the packet data network gateway sets, in the first downlink data according to the first mapping relationship between a TC and PPP information, a first TC corresponding to the first PPP information; and the packet data network gateway sends, to the relay device, the first downlink data in which the first TC is set, so that after obtaining the first TC, the relay device obtains, according to the first mapping relationship, the first PPP information corresponding to the first TC, and forwards the first downlink data to the remote device according to the first PPP information.

In the two cases 1 and 2, a corresponding PPP information obtaining mechanism is set for unicast data of different transmission protocol versions. This completes downlink transmission of unicast data by using PPP information in cases of different transmission protocol versions, and further improves the transmission mechanism.

Figure 3:
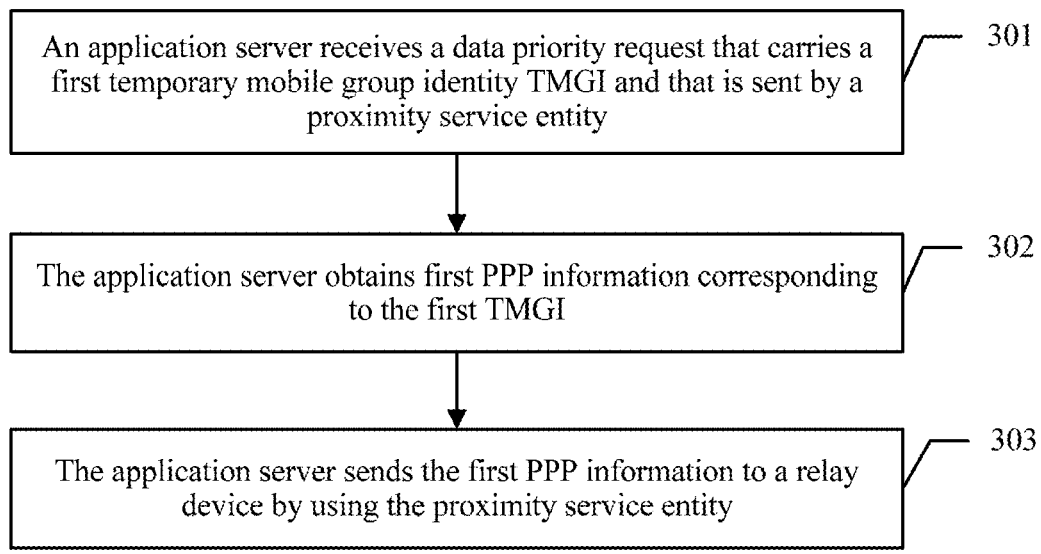
FIG. 3 is a flowchart of a data transmission method according to an embodiment of the present invention.

Referring to FIG. 3, the following describes a data transmission method in the present invention by using an example from a perspective of an application server. The method includes the following steps.

301. The application server receives a data priority that carries a first temporary mobile group identity TMGI and that is sent by a proximity-based service entity.

302. The application server obtains first PPP information corresponding to the first TMGI.

Because the application server knows PPP information corresponding to each TMGI, the application server may directly obtain the first per packet priority PPP information.

303. The application server sends the first PPP information and a first mapping relationship between a TMGI and PPP information to a relay device by using the proximity-based service entity.

The application server sends the first PPP information to the relay device, so that after receiving the first downlink data, the relay device obtains the first TMGI, obtains the first PPP information according to the first mapping relationship between a TMGI and PPP information, and forwards the first downlink data to a remote device according to the first PPP information. Certainly, the application server may also send the first mapping relationship between a TMGI and PPP information to the relay device.

The relay device receives multiple pieces of PPP information. Therefore, when receiving a downlink data packet, the relay device needs to obtain corresponding PPP information according to the first mapping relationship.

In this embodiment of the present invention, after receiving the data priority request, the application server obtains the first PPP information, and returns the first PPP information to the relay device by using the proximity-based service entity, so that the relay device can forward the first downlink data to the remote device according to the first PPP information and the locally stored first mapping relationship. This ensures that the relay device quickly forwards data of a high priority according to a data priority.

Optionally, on the basis of the foregoing embodiment corresponding to FIG. 3, in a first optional embodiment of the embodiments of the present invention, when the first PPP information corresponding to the first TMGI changes, the method further includes:

sending, by the application server, a first notification message to the proximity-based service entity, where the first notification message carries a second mapping relationship between a TMGI and PPP information, so that the proximity-based service entity sends a second notification message that carries the second mapping relationship to the relay device, and the relay device updates the stored first mapping relationship to the second mapping relationship, and after receiving the first downlink data, obtains, according to the second mapping relationship, the second PPP information corresponding to the first TMGI, and forwards the first downlink data to the remote device according to the first PPP information.

In this optional embodiment, PPP information of some data is updated, so that a transmission mechanism is more flexible, and changes according to an actual service requirement. This ensures that data of a higher priority is preferentially transmitted (for example, in a specific time period, a priority of data A is relatively low, and the priority of the data A may become higher in a specific time period, and therefore the transmission mechanism needs to be updated to obtain a right for preferential transmission).

Figure 4:
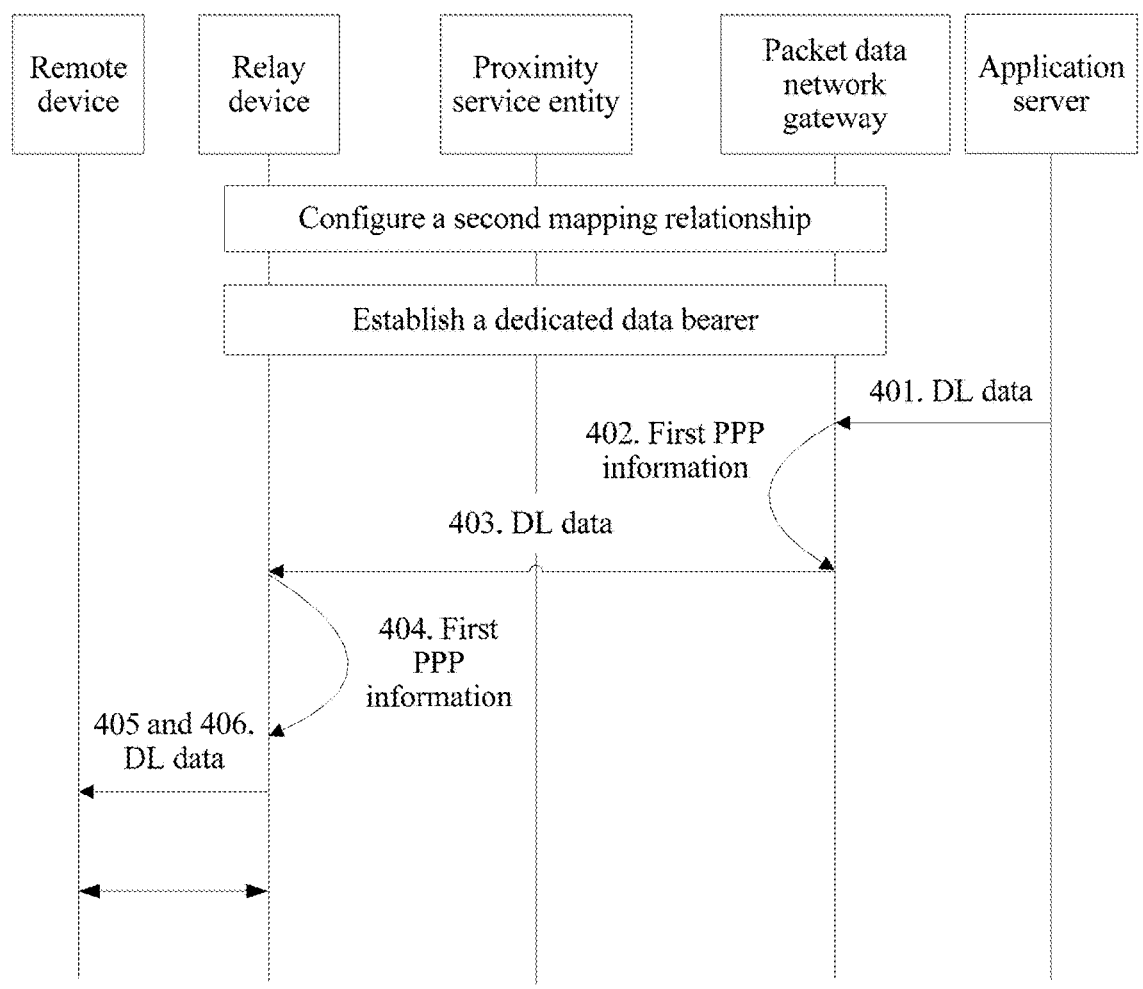
FIG. 4 is a signaling interaction diagram of a data transmission method according to an embodiment of the present invention.

For ease of understanding, the following describes in detail this embodiment of the present invention by using an example in which downlink transmission of unicast data is performed by using the foregoing mapping relationship between a DSCP and PPP information. A relay service password and a second mapping relationship between a DSCP and PPP information are configured in the relay device and the proximity-based service entity. A dedicated data bearer is established between the relay device, the proximity-based service entity, and a packet data network gateway, and the remote device connects to a network by using the relay device. Referring to FIG. 4, another embodiment of the embodiments of the present invention includes the following steps.

401. The packet data network gateway receives DL data from an application server.

402. The packet data network gateway detects, from the DL data by using a PCC rule, first PPP information corresponding to the DL data, and sets, in a data header of the DL data according to the second mapping relationship and the first PPP information, a first DSCP corresponding to the first PPP information.

403. The packet data network gateway maps the DL data to a corresponding data bearer by using a DL TFT.

404. After receiving, on a PC5 port, the DL data from the packet data network gateway, the relay device obtains the first PPP information according to the second mapping relationship and the first DSCP in the data header of the DL data.

405. The relay device forwards the DL data to the remote device according to the first PPP information.

406. The remote device receives the DL data.

Figure 5:
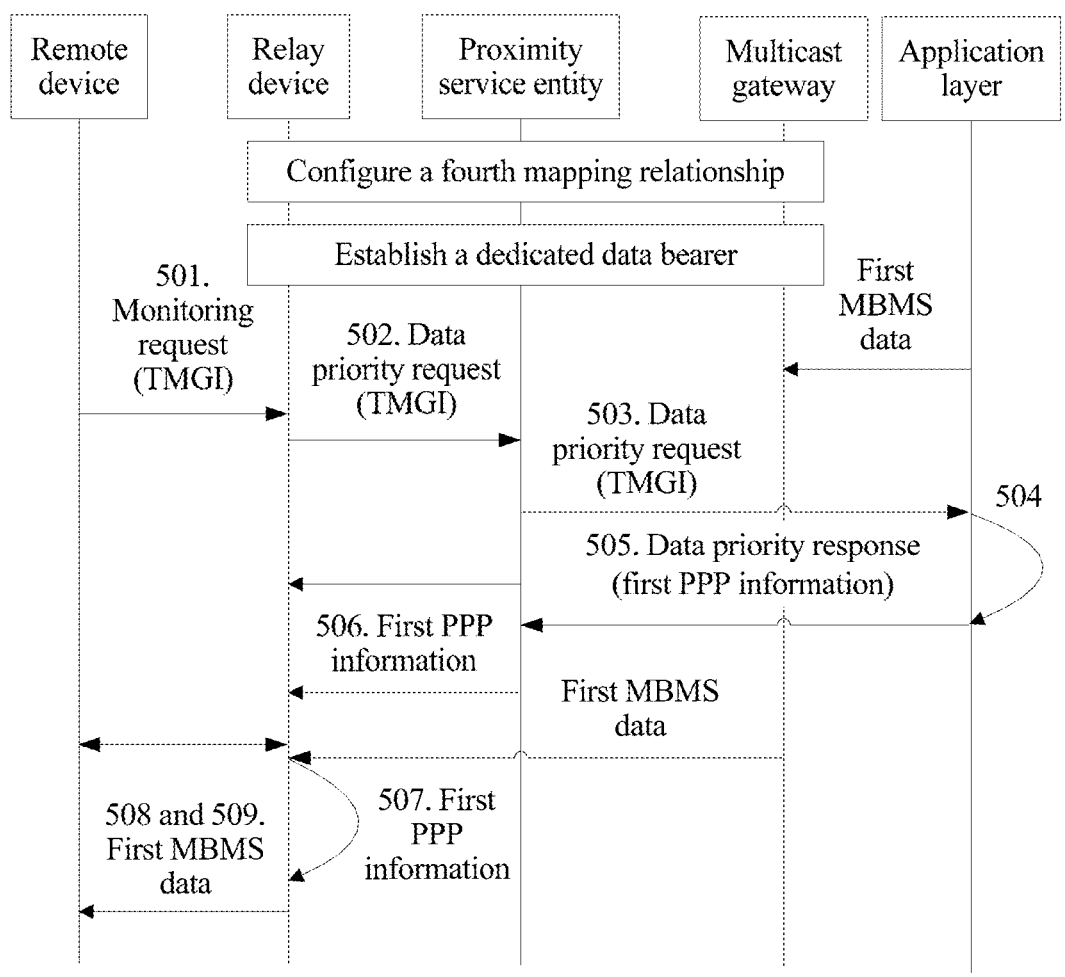
FIG. 5 is a signaling interaction diagram of a data transmission method according to an embodiment of the present invention.

For ease of understanding, the following describes in detail this embodiment of the present invention by using an example in which downlink transmission of MBMS data is performed by using the foregoing mapping relationship between a TMGI and PPP information. A relay service password and a first mapping relationship between a TMGI and PPP information are configured in the relay device and the proximity-based service entity. A dedicated data bearer is established between the relay device, the proximity-based service entity, and a packet data network gateway, and the remote device connects to a network by using the relay device. Referring to FIG. 5, another embodiment of the embodiments of the present invention includes the following steps.

501. The remote device sends a monitoring request that carries the first TMGI to the relay device.

502. The relay device sends a data priority request that carries the first TMGI to the proximity-based service entity.

503. The proximity-based service entity sends the data priority request to the application server.

504. The application server obtains first PPP information corresponding to the first TMGI.

505. The proximity-based service entity receives a data priority response that carries the first PPP information and that is returned by the application server.

506. The proximity-based service entity sends the first PPP information to the relay device.

507. The relay device stores the first PPP information, and after receiving first MBMS data, the relay device obtains, according to the first mapping relationship between a TMGI and PPP information, first PPP information corresponding to the first MBMS data.

508. The relay device forwards the first MBMS data to the remote device according to the first PPP information.

509. The remote device receives the first MBMS data.

Figure 6:
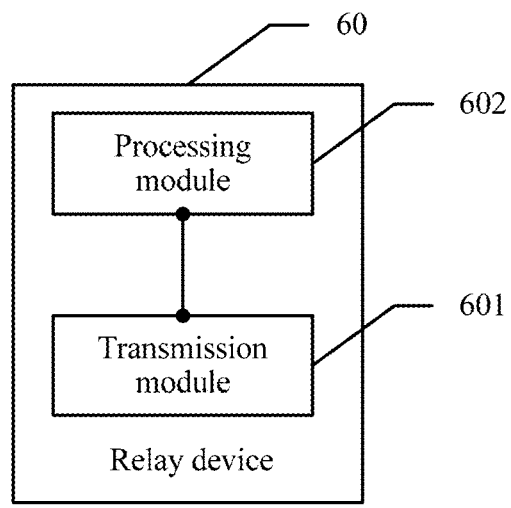
FIG. 6 is a schematic structural diagram of a relay device according to an embodiment of the present invention.

Referring to FIG. 6, the following describes a relay device that executes the foregoing data transmission method according to an embodiment of the present invention. A relay device 60 includes:

a transmission module 601, configured to receive first downlink data sent by a gateway;

a processing module 602, configured to obtain a first service identifier of the first downlink data received by the transmission module 602;

obtain, according to a first mapping relationship between a service identifier and per packet priority PPP information, first PPP information corresponding to the first service identifier; and forward, by using the transmission module 602, the first downlink data to a remote device according to the first PPP information.

In this embodiment of the present invention, the relay device pre-configures the first mapping relationship between a service identifier and PPP information, so that after the transmission module 601 receives the first downlink data, the processing module 602 obtains the first service identifier of the first downlink data, and obtains, according to the first mapping relationship, the first PPP information corresponding to the first service identifier, and then forwards the first downlink data according to the first PPP information by using the transmission module 601. This ensures that the relay device quickly forwards data of a high priority according to a data priority, and accurately and quickly obtains PPP information of a downlink data packet, without a need to perform mapping for multiple times. This effectively improves a rate and accuracy of downlink data transmission.

Optionally, the transmission module 601 is further configured to:

obtain the first mapping relationship from the proximity-based service entity.

Optionally, the first downlink data is first downlink unicast data, and the first service identifier includes one of the following:

a differentiated services code point DSCP, a traffic class TC, or a port number.

Optionally, when the first downlink data is first downlink multicast data, the first service identifier is a temporary mobile group identity TMGI.

The transmission module 601 is specifically configured to receive first downlink multicast data sent by a multicast gateway.

The processing module 602 is specifically configured to: obtain a first TMGI of the first downlink multicast data, and obtain, according to the first TMGI and a first mapping relationship between a TMGI and PPP information, fifth PPP information corresponding to the first TMGI; and forward the first downlink multicast data to the remote device according to the fifth PPP information by using the transmission module 601.

Optionally, before the processing module 602 obtains, according to the first mapping relationship between a service identifier and PPP information, first the PPP information corresponding to the first service identifier, the transmission module 601 is further configured to:

receive a monitoring request that carries the first TMGI and that is sent by the remote device, and send, to the proximity-based service entity, a data priority request that carries the first TMGI; and receive a data priority response that is sent by the proximity-based service entity and that carries the first PPP information or the first mapping relationship.

Optionally, before receiving the first downlink multicast data sent by a multicast gateway, the transmission module 601 is further configured to:

receive a first notification message sent by the proximity-based service entity, where the first notification message carries a second mapping relationship between the first service identifier and the PPP information.

The processing module 602 is further configured to update the first mapping relationship to the second mapping relationship.

Figure 7:
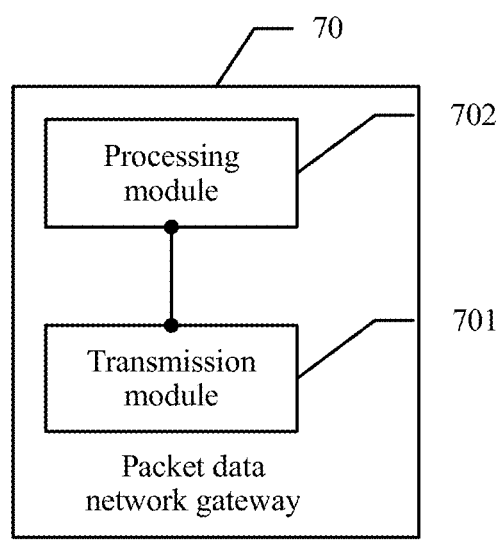
FIG. 7 is a schematic structural diagram of a packet data network gateway according to an embodiment of the present invention.

Referring to FIG. 7, the following describes a packet data network gateway that executes the foregoing data transmission method according to an embodiment of the present invention. A packet data network gateway 70 includes:

a transmission module 701, configured to receive first downlink data sent by an application layer; and a processing module 702, configured to: obtain first per packet priority PPP information from the first downlink data received by the transmission module 701, where optionally and specifically, the processing module 702 may obtain, according to a policy and charging control PCC rule, the first PPP information from the first downlink data by means of filtering;

set, in the first downlink data according to a first mapping relationship between a service identifier and PPP information, a first service identifier corresponding to the first PPP information, where optionally and specifically, the processing module 702 may set the first DSCP or the first TC in a data header of the first downlink data; and send, to a relay device by using the transmission module 701, the first downlink data in which the first service identifier is set.

Optionally, the first downlink data is first downlink unicast data, and the first service identifier includes a differentiated services code point DSCP or a traffic class TC.

In this embodiment of the present invention, the processing module 702 sets, in the first downlink data received by the transmission module, the first service identifier according to the locally stored first mapping relationship, so that after receiving the first downlink data, the relay device obtains the first service identifier from the first downlink data, and obtains, according to the first mapping relationship, the first PPP information corresponding to the first service identifier, and then forwards the first downlink data according to the first PPP information. This ensures that the relay device quickly forwards data of a high priority according to a data priority.

Figure 8:
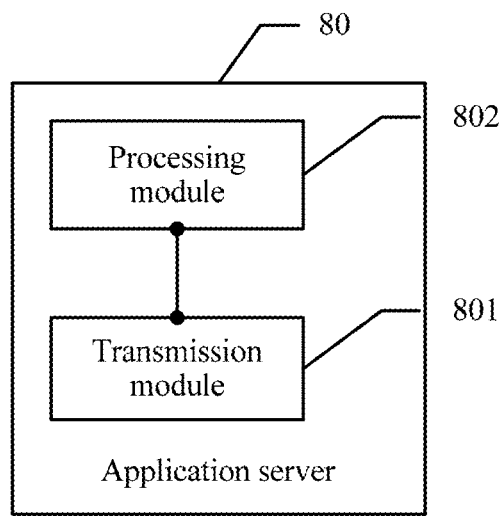
FIG. 8 is a schematic structural diagram of an application server according to an embodiment of the present invention.

Referring to FIG. 8, the following describes an application server that executes the foregoing data transmission method according to an embodiment of the present invention. An application server 80 includes:

a transmission module 801, configured to receive a data priority request that carries a first temporary mobile group identity TMGI and that is sent by a proximity-based service entity; and a processing module 802, configured to obtain first per packet priority PPP information corresponding to the first TMGI in the data priority request received by the transmission module 801.

The transmission module 801 sends the first PPP information obtained by the processing module 802 and a first mapping relationship between a TMGI and PPP information to a relay device by using the proximity-based service entity.

Optionally, the transmission module 801 is further configured to:

send a first notification message to the proximity-based service entity, where the first notification message carries a second mapping relationship between the TMGI and the PPP information.

In this embodiment of the present invention, after the transmission module 801 receives the data priority request, the processing module 802 obtains the first PPP information, and returns the first PPP information to the relay device by using the transmission module 801 and the proximity-based service entity, so that the relay device can forward the first downlink data to a remote device according to the first PPP information and the locally stored first mapping relationship. This ensures that the relay device quickly forwards data of a high priority according to a data priority.

Figure 9:
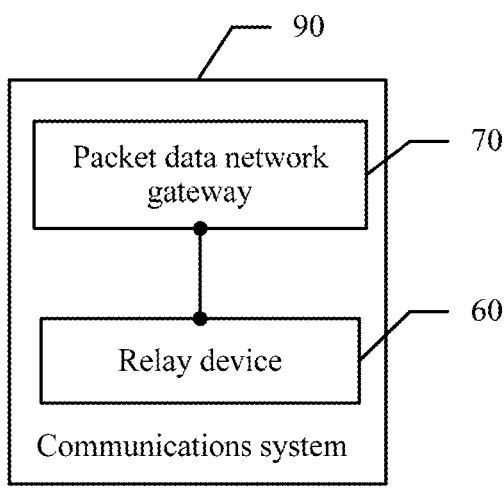
FIG. 9 is a schematic structural diagram of a communications system according to an embodiment of the present invention.

Referring to FIG. 9, a communications system includes:
the relay device 60 in FIG. 6; and
the packet data network gateway 70 in FIG. 7.
Optionally, the communications system further includes:
the application server 80 in FIG. 8.

The present invention further provides a computer storage medium, and a program is stored in the storage medium. When the program is executed, a part or all of the steps in the foregoing data transmission method are performed.

The present invention further provides a computer storage medium, and a program is stored in the storage medium. When the program is executed, a part or all of the steps in the foregoing data transmission method executed by the relay device, the packet data network gateway, or the application server are performed.

Figure 10:
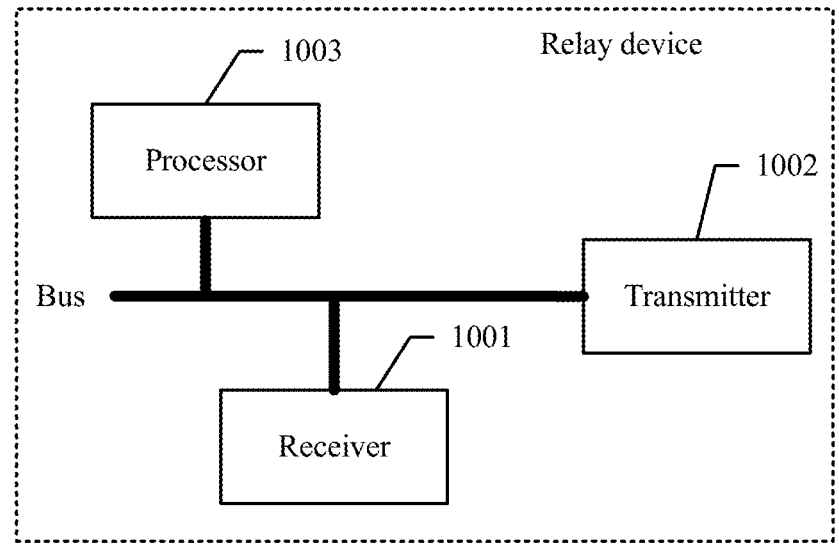
FIG. 10 is another schematic structural diagram of a relay device according to an embodiment of the present invention.

FIG. 10 is another schematic structural diagram of a relay device 100 according to an embodiment of the present invention. The relay device 100 may include at least one network interface or another communications interface, at least one receiver 1001, at least one transmitter 1002, at least one processor 1003, and a memory 1004, so as to implement connections and communication between these apparatuses. The at least one network interface (which may be wired or wireless) is used to implement a communication connection between a system gateway and at least one other network element over the Internet, a wide area network, a local area network, a metropolitan area network, or the like.

The memory 1004 may include a read only memory and a random access memory, and provides an instruction and data for the processor 1003. A part of the memory 1004 may further include a high-speed random access memory (full name: Random Access Memory, RAM for short), and may further include a non-volatile memory (full name: non-volatile memory, NVM for short).

The memory 1004 stores the following elements: an executable module or a data structure, a subset thereof, or an extended set thereof:

an operation instruction, including various operation instructions and used for implementing various operations; and an operating system, including various system programs and used for implementing various basic services and processing a hardware-based task.

In this embodiment of the present invention, the processor 1003 executes the following operations by invoking an operation instruction stored in the memory 1004 (the operation instruction may be stored in the operating system):

receiving, by using the receiver 1001, first downlink data sent by a gateway;

obtaining a first service identifier of the received first downlink data;

obtaining, according to a first mapping relationship between a service identifier and per packet priority PPP information, first PPP information corresponding to the first service identifier; and forwarding the first downlink data to a remote device according to the first PPP information by using the transmitter 1002.

In some implementations, the processor 1003 may further perform the following step:

obtaining the first mapping relationship from the proximity-based service entity by using the receiver 1001.

The first downlink data is first downlink unicast data, and the first service identifier includes one of the following:

a differentiated services code point DSCP, a traffic class TC, or a port number.

Alternatively, the first downlink data is first downlink multicast data, and the first service identifier is a temporary mobile group identity TMGI.

In some implementations, before obtaining, according to the first mapping relationship between a service identifier and PPP information, the first PPP information corresponding to the first service identifier, the processor 1003 may further perform the following steps:

receiving, by using the receiver 1001, a monitoring request that carries the first TMGI and that is sent by the remote device;

sending, by using the transmitter 1002, a data priority request that carries the first TMGI to the proximity-based service entity; and receiving, by using the receiver 1001, a data priority response that is sent by the proximity-based service entity and that carries a first mapping relationship between the TMGI and PPP information or carries the first PPP information and.

In some implementations, before receiving the first downlink multicast data sent by a multicast gateway, the processor 1003 may further perform the following steps:

receiving, by using the receiver 1001, a first notification message sent by the proximity-based service entity, where the first notification message carries a second mapping relationship between the TMGI and the PPP information; and updating the first mapping relationship to the second mapping relationship.

Figure 11:
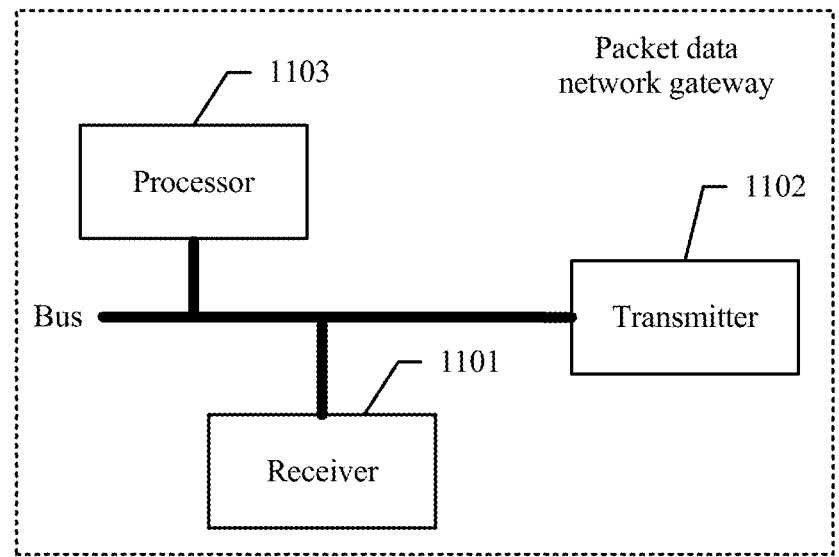
FIG. 11 is another schematic structural diagram of a packet data network gateway according to an embodiment of the present invention.

FIG. 11 is another schematic structural diagram of a packet data network gateway 110 according to an embodiment of the present invention. The packet data network gateway 100 may include at least one network interface or another communications interface, at least one receiver 1101, at least one transmitter 1102, at least one processor 1103, and a memory 1104, so as to implement connections and communication between these apparatuses. The at least one network interface (which may be wired or wireless) is used to implement a communication connection between a system gateway and at least one other network element over the Internet, a wide area network, a local area network, a metropolitan area network, or the like.

The memory 1104 may include a read only memory and a random access memory, and provides an instruction and data for the processor 1103. A part of the memory 1104 may further include a high-speed random access memory (full name: Random Access Memory, RAM for short), and may further include a non-volatile memory (full name: non-volatile memory, NVM for short).

The memory 1104 stores the following elements: an executable module or a data structure, a subset thereof, or an extended set thereof:

an operation instruction, including various operation instructions and used for implementing various operations; and an operating system, including various system programs and used for implementing various basic services and processing a hardware-based task.

In this embodiment of the present invention, the processor 1103 executes the following operations by invoking an operation instruction stored in the memory 1104 (the operation instruction may be stored in the operating system):

receiving, by using the receiver 1101, first downlink data sent by an application layer;

obtaining first per packet priority PPP information from the first downlink data received by the receiver 1101;

setting, in the first downlink data according to a first mapping relationship between a service identifier and PPP information, a first service identifier corresponding to the first PPP information; and sending, by using the transmitter 1102 to a relay device, the first downlink data in which the first service identifier is set.

The first downlink data is first downlink unicast data, and the first service identifier includes a differentiated services code point DSCP or a traffic class TC.

In some implementations, the processor 1103 may further perform the following step:

setting the first DSCP or the first TC in a data header of the first downlink data.

In some implementations, the processor 1103 may further perform the following step:

obtaining, according to a policy and charging control PCC rule, the first PPP information from the first downlink data by means of filtering.

Figure 12:
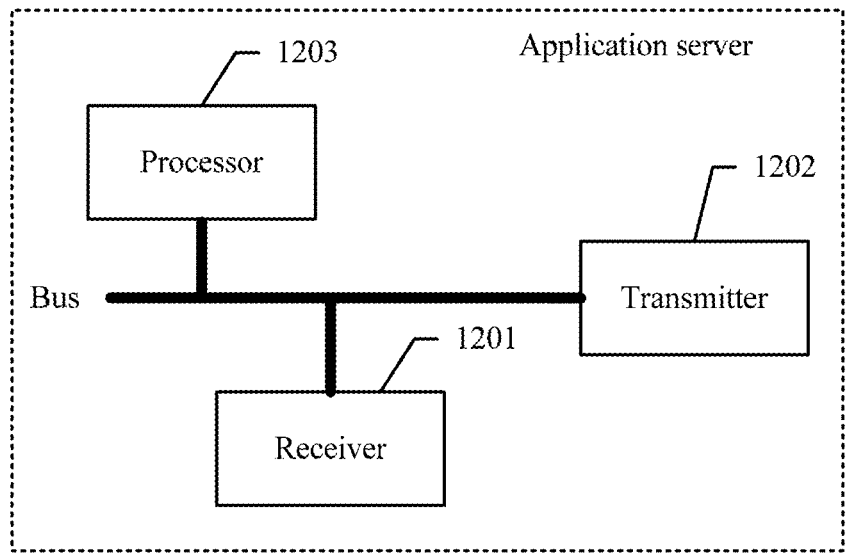
FIG. 12 is another schematic structural diagram of an application server according to an embodiment of the present invention.

FIG. 12 is another schematic structural diagram of an application server 120 according to an embodiment of the present invention. The packet data network gateway 120 may include at least one network interface or another communications interface, at least one receiver 1201, at least one transmitter 1202, at least one processor 1203, and a memory 1204, so as to implement connections and communication between these apparatuses. The at least one network interface (which may be wired or wireless) is used to implement a communication connection between a system gateway and at least one other network element over the Internet, a wide area network, a local area network, a metropolitan area network, or the like.

The memory 1204 may include a read only memory and a random access memory, and provides an instruction and data for the processor 1203. A part of the memory 1204 may further include a high-speed random access memory (full name: Random Access Memory, RAM for short), and may further include a non-volatile memory (full name: non-volatile memory, NVM for short).

The memory 1204 stores the following elements: an executable module or a data structure, a subset thereof, or an extended set thereof:

an operation instruction, including various operation instructions and used for implementing various operations; and an operating system, including various system programs and used for implementing various basic services and processing a hardware-based task.

In this embodiment of the present invention, the processor 1203 executes the following operations by invoking an operation instruction stored in the memory 1204 (the operation instruction may be stored in the operating system):

receiving, by using the receiver 1201, a data priority request that carries a first temporary mobile group identity TMGI and that is sent by a proximity-based service entity;

obtaining first PPP information corresponding to the first TMGI in the data priority request received by the receiver 1201; and sending the obtained first PPP information and a first mapping relationship between a TMGI and PPP information to a relay device by using the transmitter 1202 and the proximity-based service entity.

In some implementations, the processor 1203 may further perform the following step:

sending a first notification message to the proximity-based service entity by using the transmitter 1202, where the first notification message carries a second mapping relationship between the TMGI and the PPP information.

Figure 13:
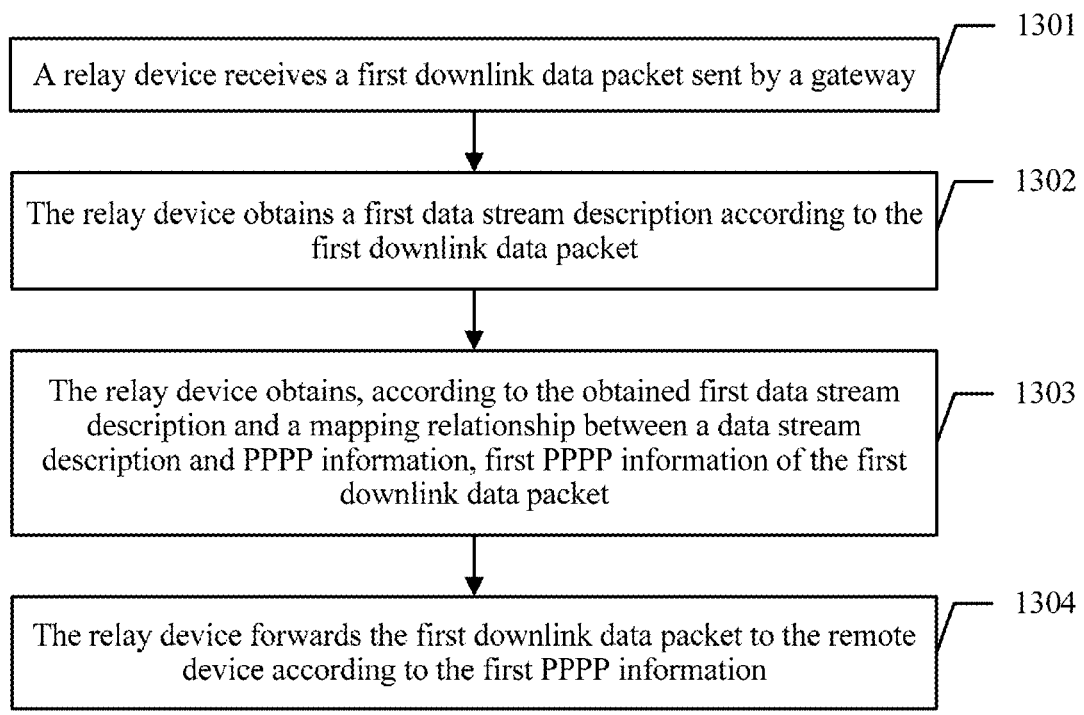
FIG. 13 is a flowchart of a data transmission method according to an embodiment of the present invention.

Referring to FIG. 13, a data transmission method according to an embodiment of the present invention is described form a perspective of improving a relay device. This embodiment of the present invention includes the following steps.

1301. The relay device receives a first downlink data packet sent by a gateway.

1302. The relay device obtains a first data stream description according to the first downlink data packet.

1302. The relay device obtains, according to the first data stream description and a mapping relationship between a data stream description and proximity services per packet priority (full name: Proximity Services Per packet priority, PPPP for short) information, first PPPP information of the first downlink data packet.

The obtaining, by the relay device, a first data stream description according to the first downlink data packet includes:

filtering, by the relay device, the first downlink data packet, to determine the first data stream description corresponding to the first downlink data packet. "Filtering" specifically means determining data stream descriptions of a same IP 5-tuple according to the first downlink data packet, or determining data stream descriptions of a same IP 5-tuple according to the first downlink data packet provided that QCIs are the same, or determining data stream descriptions of a same TMGI. The data stream description may be an IP 5-tuple or a TMGI, and one data stream description may include many IP 5-tuples. An IP 5-tuple is located in an IP header of a downlink data packet. The relay device may first read an IP 5-tuple of the first downlink data packet, and then determine, according to the IP 5-tuple, the first data stream description matching the IP 5-tuple. In addition, downlink data packets from different application servers correspond to different IP 5-tuples.

Optionally, the method further includes:

receiving, by the relay device, a first message sent by the remote device, where the first message carries the mapping relationship.

Because the first downlink data packet is classified into a unicast data packet or a multicast data packet, a data stream description corresponding to the data packet is different. Details are as follows.

1. When the first downlink data packet is a unicast data packet, the data stream description is an Internet Protocol IP 5-tuple.

The relay device may differentiate PPPP information of unicast data packets from a same application server according to the data stream description, and the PPPP information of the unicast data packets is represented by a port number. The IP-5-Tuple includes a set of a same source address, a same destination address, and different port numbers. That is, the first data stream description is an IP-5-Tuple that includes a set of a same source address, a same destination address, and different port numbers.

2. When the first downlink data packet is a multicast data packet, the data stream description is a temporary mobile group identity TMGI. In this case, the relay device may update PPPP information of multicast data packets from a same application server, which may be specifically:

receiving, by the relay device, a priority update request sent by the remote device, and updating, by the relay device, the mapping relationship between the data stream description and PPPP information; and returning, by the relay device, a priority update response to the remote device, where the priority update response carries a mapping relationship between the TMGI and PPPP information.

In addition, the first data stream description is obtained in one of the following manners:

the first data stream description is generated by an application server according to an IP address of the remote device;

the first data stream description is obtained by the remote device by adding, to first identification information sent by the application server, the destination address of the IP 5-tuple and a destination port to which the first downlink data packet is sent, where the first identification information includes the source address of the IP 5-tuple and a source port that sends the first downlink data packet; or the first data stream description is generated by the relay device according to second identification information sent by the remote device, where the first identification information includes the source address of the IP 5-tuple, the destination address of the IP 5-tuple, a source port that sends the first downlink data packet, and a destination port to which the first downlink data packet is sent.

Optionally, the mapping relationship may further include a mapping relationship between a data stream description, a QCI, and PPPP information.

1303. The relay device forwards the first downlink data packet to the remote device according to the first PPPP information.

In this embodiment of the present invention, the mapping relationship between a data stream description and PPPP information is configured, so that after receiving the first downlink data packet, the relay device can obtain the first PPPP information according to the obtained first data stream description and the mapping relationship, so that a data packet of a high priority is forwarded. According to this solution, only the relay device is improved. This is highly operable and easy to implement, without a need to improve a network side, thereby effectively reducing improvement costs.

Figure 14:
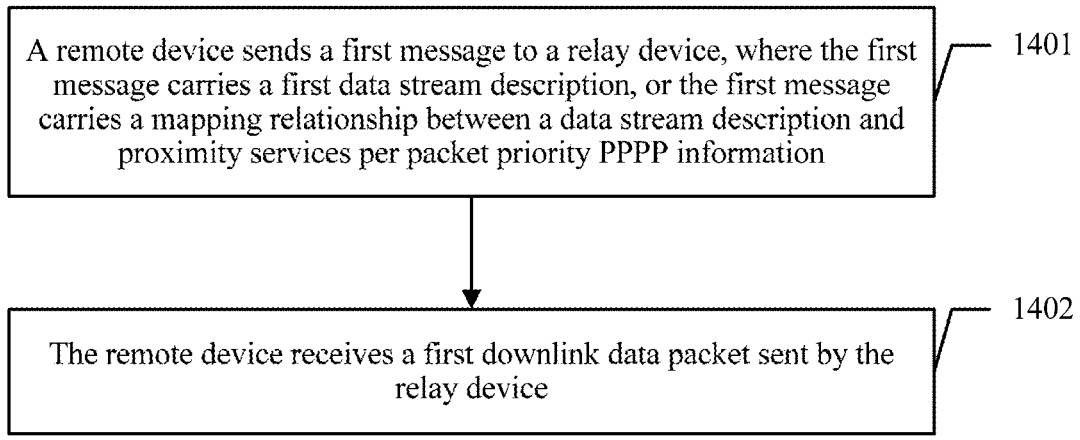
FIG. 14 is a flowchart of another data transmission method according to an embodiment of the present invention.

Referring to FIG. 14, a data transmission method according to an embodiment of the present invention is described form a perspective of improving a remote device. This embodiment of the present invention includes the following steps.

1401. A remote device sends a first message to a relay device, where the first message carries a first data stream description, or the first message carries a mapping relationship between a data stream description and proximity services per packet priority PPPP information.

When the first downlink data packet is a unicast data packet, the first data stream description is an Internet Protocol IP 5-tuple.

When the first downlink data packet is a multicast data packet, the first data stream description is a temporary mobile group identity TMGI.

Optionally, the first data stream description is obtained in one of the following manners:

the first data stream description is generated by an application server according to an IP address of the remote device; or the first data stream description is obtained by the remote device by adding, to first identification information sent by the application server, a destination address of the IP 5-tuple and a destination port to which the second downlink data packet is sent, where the first identification information includes a source address of the IP 5-tuple and a source port that sends the first downlink data packet.

1402. The remote device receives a first downlink data packet sent by the relay device, where the first downlink data packet is a downlink data packet that is corresponding to first PPPP information and that is determined by the relay device according to at least one of the mapping relationship or the first data stream description after receiving the first downlink data packet sent by a gateway.

In this embodiment of the present invention, when the remote device needs to request a data packet from the relay device, the remote device sends the first message to the relay device, so that the relay device obtains the PPPP information of the first downlink data packet according to the first message, so that a data packet of a high priority is forwarded. According to this solution, only the remote device is improved. This is highly operable and easy to implement, without a need to improve a network side, thereby effectively reducing improvement costs.

Optionally, in some embodiments of the present invention, the method further includes:

sending, by the remote device, second identification information to the relay device, where the second identification information includes the source address of the IP 5-tuple, the destination address of the IP 5-tuple, the source port that sends the second downlink data packet, and the destination port to which the second downlink data packet is sent.

Figure 15:
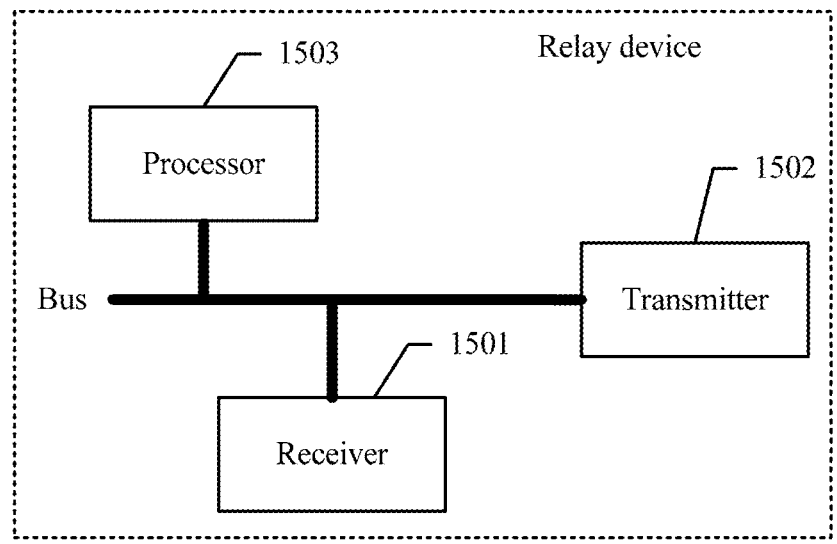
FIG. 15 is another schematic structural diagram of a relay device according to an embodiment of the present invention.

FIG. 15 is another schematic structural diagram of a relay device 150 according to an embodiment of the present invention. The relay device 150 may include at least one network interface or another communications interface, at least one receiver 1501, at least one transmitter 1502, at least one processor 1503, and a memory 1504, so as to implement connections and communication between these apparatuses. The at least one network interface (which may be wired or wireless) is used to implement a communication connection between a system gateway and at least one another network element over the Internet, a wide area network, a local area network, a metropolitan area network, or the like.

The memory 1504 may include a read only memory and a random access memory, and provides an instruction and data for the processor 1503. A part of the memory 1504 may further include a high-speed random access memory, and may further include a non-volatile memory (full name: non-volatile memory, NVM for short).

The memory 1504 stores the following elements: an executable module or a data structure, a subset thereof, or an extended set thereof:

an operation instruction, including various operation instructions and used for implementing various operations; and an operating system, including various system programs and used for implementing various basic services and processing a hardware-based task.

In this embodiment of the present invention, the processor 1503 executes the following operations by invoking an operation instruction stored in the memory 1504 (the operation instruction may be stored in the operating system):

receiving, by using the receiver 1501, a first downlink data packet sent by a gateway;

obtaining a first data stream description according to the first downlink data packet;

obtaining, according to the first data stream description and a mapping relationship between a data stream description and proximity services per packet priority PPPP information, first PPPP information of the first downlink data packet; and forwarding, by using the transmitter, the first downlink data packet to the remote device according to the first PPPP information.

In some embodiments of the present invention, the processor 1503 specifically performs the following step:

filtering the first downlink data packet, to determine the first data stream description corresponding to the first downlink data packet.

In some embodiments of the present invention, the processor 1503 specifically performs the following step:

receiving, by using the receiver 1501, a first message sent by the remote device, where the first message carries the mapping relationship.

Optionally, the first downlink data packet is a unicast data packet, and the data stream description is an Internet Protocol IP 5-tuple.

The data stream description is used to differentiate between PPPP information of unicast data packets from a same application server, the PPPP information of the unicast data packets is represented by a port number, and the IP 5-tuple includes a set of a same source address, a same destination address, and different port numbers.

Optionally, the first downlink data packet is a multicast data packet, and the data stream description is a temporary mobile group identity TMGI.

In some embodiments of the present invention, the processor 1503 specifically performs the following steps:

receiving, by using the transmitter 1501, a priority update request sent by the remote device;

updating the mapping relationship between the data stream description and PPPP information; and returning, by using the transmitter 1502, a priority update response to the remote device.

Optionally, the first data stream description is obtained in one of the following manners:

the first data stream description is generated by an application server according to an IP address of the remote device;

the first data stream description is obtained by the remote device by adding, to first identification information sent by the application server, the destination address of the IP 5-tuple and a destination port to which the first downlink data packet is sent, where the first identification information includes the source address of the IP 5-tuple and a source port that sends the first downlink data packet; or the first data stream description is generated by the relay device according to second identification information sent by the remote device, where the second identification information includes the source address of the IP 5-tuple, the destination address of the IP 5-tuple, a source port that sends the first downlink data packet, and a destination port to which the first downlink data packet is sent.

Figure 16:
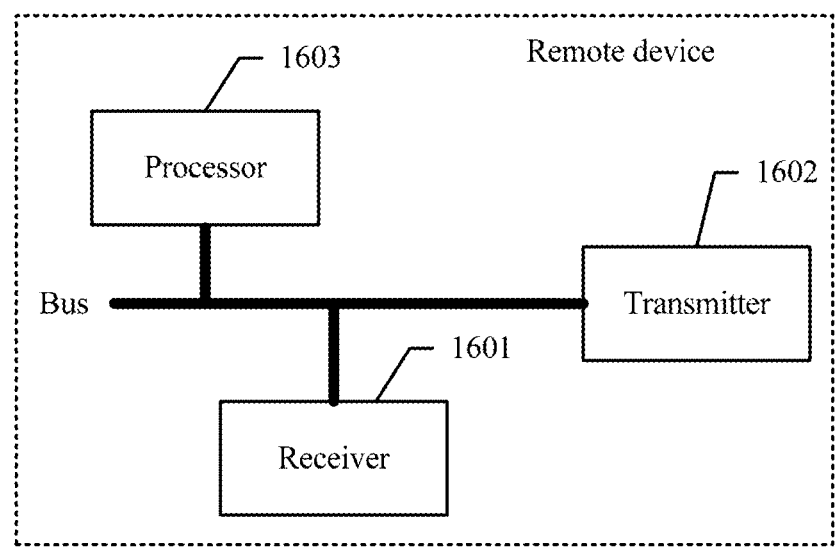
FIG. 16 is another schematic structural diagram of a remote device according to an embodiment of the present invention.

FIG. 16 is another schematic structural diagram of a remote device 160 according to an embodiment of the present invention. The remote device 160 may include at least one network interface or another communications interface, at least one receiver 1601, at least one transmitter 1602, at least one processor 1603, and a memory 1604, so as to implement connections and communication between these apparatuses. The at least one network interface (which may be wired or wireless) is used to implement a communication connection between a system gateway and at least one other network element over the Internet, a wide area network, a local area network, a metropolitan area network, or the like.

The memory 1604 may include a read only memory and a random access memory, and provides an instruction and data for the processor 1603. A part of the memory 1604 may further include a high-speed random access memory, and may further include a non-volatile memory (full name: non-volatile memory, NVM for short).

The memory 1604 stores the following elements: an executable module or a data structure, a subset thereof, or an extended set thereof:

an operation instruction, including various operation instructions and used for implementing various operations; and an operating system, including various system programs and used for implementing various basic services and processing a hardware-based task.

In this embodiment of the present invention, the processor 1603 executes the following operations by invoking an operation instruction stored in the memory 1604 (the operation instruction may be stored in the operating system):

sending, by using the transmitter 1602, a first message to a relay device, where the first message carries a first data stream description, or the first message carries a mapping relationship between a data stream description and proximity services per packet priority PPPP information; and receiving, by using the receiver 1601, a first downlink data packet sent by the relay device, where the first downlink data packet is a downlink data packet that is corresponding to first PPPP information and that is determined by the relay device according to at least one of the mapping relationship or the first data stream description after receiving the first downlink data packet sent by a gateway.

Optionally, when the first downlink data packet is a unicast data packet, the first data stream description is an Internet Protocol IP 5-tuple.

Optionally, when the first downlink data packet is a multicast data packet, the first data stream description is a temporary mobile group identity TMGI.

Optionally, the first data stream description is obtained in one of the following manners:

the first data stream description is generated by an application server according to an IP address of the remote device; or the first data stream description is obtained by the remote device by adding, to first identification information sent by the application server, a destination address of the IP 5-tuple and a destination port to which the first downlink data packet is sent, where the first identification information includes a source address of the IP 5-tuple and a source port that sends the first downlink data packet.

In some embodiments of the present invention, the processor 1603 may further perform the following step:

sending, by using the transmitter 1602, second identification information to the relay device, where the second identification information includes the source address of the IP 5-tuple, the destination address of the IP 5-tuple, the source port that sends the first downlink data packet, and the destination port to which the first downlink data packet is sent.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (English full name: Read-Only Memory, ROM for short), a RAM, a magnetic disk, or an optical disc.

The foregoing describes in detail a data transmission method, a related device, and a system that are provided in the present invention. In this specification, specific examples are used to describe the principle and implementations of the present invention, and the description of the embodiments is only intended to help understand the method and core idea of the present invention. In addition, a person of ordinary skill in the art may, based on the idea of the present invention, make modifications with respect to the specific implementations and the application scope. Therefore, the content of this specification shall not be construed as a limitation to the present invention.

What is claimed is:

1. A data transmission method, wherein the method comprises:

receiving, by a relay device, first downlink data from a gateway, wherein the first downlink data comprises first downlink unicast data;

obtaining, by the relay device, a first service identifier of the first downlink data, wherein the first service identifier comprises at least one of a differentiated services code point (DSCP), a traffic class (TC), or a port number;

obtaining, by the relay device according to a first mapping relationship between the first service identifier and first per packet priority (PPP) information, the first PPP information corresponding to the first service identifier; and forwarding, by the relay device, the first downlink data to a remote device according to the first PPP information.

2. The method according to claim 1, wherein the method further comprises:

obtaining, by the relay device, the first mapping relationship from a proximity-based service entity.

3. A data transmission method, wherein the method comprises:

receiving, by a packet data network gateway (P-GW), first downlink data from an application layer, wherein the first downlink data comprises first downlink unicast data;

obtaining, by the P-GW, first per packet priority (PPP) information from the first downlink data;

setting, in the first downlink data, by the P-GW and according to a first mapping relationship between a first service identifier and the first PPP information, the first service identifier corresponding to the first PPP information, wherein the first service identifier comprises a differentiated services code point (DSCP) or a traffic class (TC); and sending, by the P-GW to a relay device, the first downlink data including the first service identifier.

4. The method according to claim 3, wherein the setting the first service identifier comprises:

setting, by the P-GW, the DSCP or the TC in a data header of the first downlink data.

5. A relay device, wherein the relay device comprises:

at least one processor;

a non-transitory memory storage comprising programming instructions;

a communications interface;

a receiver; and a transmitter, wherein the at least one processor, the receiver, the transmitter, the memory storage, and the communications interface communicate with each other by using a bus; and the programming instructions, when executed by the at least one processor, cause the at least one processor to perform operations comprising:

receiving, by using the receiver, first downlink data sent by a gateway, wherein the first downlink data comprises first downlink unicast data;

obtaining a first service identifier of the first downlink data received by the receiver, wherein the first service identifier comprises at least one of a differentiated services code point (DSCP), a traffic class (TC), or a port number;

obtaining, according to a first mapping relationship between the first service identifier and first per packet priority (PPP) information, the first PPP information corresponding to the first service identifier; and forwarding the first downlink data to a remote device according to the first PPP information by using the transmitter.

6. The relay device according to claim 5, wherein the operations comprise:

obtaining the first mapping relationship from a proximity-based service entity.

7. A data transmission method, wherein the method comprises:

receiving, by a relay device, first downlink data from a gateway, wherein the first downlink data comprises first downlink multicast data;

obtaining, by the relay device, a first service identifier of the first downlink data, wherein the first service identifier comprises a temporary mobile group identity (TMGI);

obtaining, by the relay device according to a first mapping relationship between the first service identifier and first per packet priority (PPP) information, the first PPP information corresponding to the first service identifier;

forwarding, by the relay device, the first downlink data to a remote device according to the first PPP information; and updating, by the relay device, a second mapping relationship between the first service identifier and second PPP information to the first mapping relationship, wherein the second mapping relationship is saved in the relay device before obtaining the first mapping relationship.

8. The method according to claim 7, wherein the method further comprises:

receiving, by the relay device, a monitoring request that is sent by the remote device, wherein the monitoring request carries the TMGI;

sending, by the relay device to a proximity-based service entity, a data priority request that carries the TMGI; and receiving, by the relay device, a data priority response that is sent by the proximity-based service entity, wherein the data priority response carries the first mapping relationship or the first PPP information.

9. A data transmission method, wherein the method comprises:

receiving, by a packet data network gateway (P-GW), first downlink data from an application layer;

obtaining, by the P-GW, first per packet priority (PPP) information from the first downlink data, wherein the obtaining the first PPP information from the first downlink data comprises obtaining, by the P-GW according to a policy and charging control (PCC) rule, the first PPP information from the first downlink data using filtering setting, in the first downlink data, by the P-GW and according to a first mapping relationship between a first service identifier and the first PPP information, the first service identifier corresponding to the first PPP information; and sending, by the P-GW to a relay device, the first downlink data including the first service identifier.

10. A relay device, wherein the relay device comprises:
at least one processor;
a non-transitory memory storage comprising programming instructions;
a communications interface;
a receiver; and
a transmitter, wherein
the at least one processor, the receiver, the transmitter, the memory storage, and the communications interface communicate with each other by using a bus; and
the programming instructions, when executed by the at least one processor, cause the at least one processor to perform operations comprising:

receiving, by using the receiver, first downlink data sent by a gateway, wherein the first downlink data comprises first downlink multicast data;

obtaining a first service identifier of the first downlink data received by the receiver, wherein the first service identifier comprises a temporary mobile group identity (TMGI);

obtaining, according to a first mapping relationship between the first service identifier and first per packet priority (PPP) information, the first PPP information corresponding to the first service identifier;

forwarding the first downlink data to a remote device according to the first PPP information by using the transmitter;

receiving, by using the receiver, a monitoring request that is sent by the remote device, wherein the monitoring request carries the TMGI;

sending, by using the transmitter, a data priority request that carries the TMGI to a proximity-based service entity; and receiving, by using the receiver, a data priority response that is sent by the proximity-based service entity, wherein the data priority response carries the first mapping relationship or the first PPP information.

* * * * *